United States Patent [19]
Berger et al.

[11] Patent Number: 5,428,199
[45] Date of Patent: Jun. 27, 1995

[54] FRAME MEMBER FOR SUPPORTING A WORKPIECE IN A MACHINE TOOL

[75] Inventors: Hansruedi Berger, Feuerthalen; Fritz Fankhauser, Schaffhausen, both of Switzerland

[73] Assignee: Georg Fischer AG, Schaffhausen, Switzerland

[21] Appl. No.: 108,386

[22] Filed: Aug. 18, 1993

[30] Foreign Application Priority Data

Aug. 18, 1992 [CH] Switzerland ............... 02571/92

[51] Int. Cl.$^6$ .............................................. B23H 1/00
[52] U.S. Cl. ................................. 219/69.11; 269/286
[58] Field of Search ............. 219/69.11, 69.12, 158; 269/286, 293

[56] References Cited

U.S. PATENT DOCUMENTS

| | | | |
|---|---|---|---|
| 4,631,382 | 12/1986 | Fukunaga et al. | 219/69.11 |
| 4,656,326 | 4/1987 | Ramsbro | 219/69.11 |
| 4,745,253 | 5/1988 | Girardin | 219/69.12 |
| 4,777,340 | 10/1988 | Kobayashi et al. | 219/69.12 |
| 4,786,776 | 11/1988 | Ramsbro | 219/69.12 |
| 4,788,400 | 11/1988 | Aso et al. | 219/69.12 |
| 4,900,888 | 2/1990 | Lee | 219/69.11 |

FOREIGN PATENT DOCUMENTS

| | | | |
|---|---|---|---|
| 1-119347 | 5/1989 | Japan . | |
| 2-116420 | 5/1990 | Japan | 219/69.12 |

*Primary Examiner*—Geoffrey S. Evans
*Attorney, Agent, or Firm*—Bachman & LaPointe

[57] ABSTRACT

A frame member, comprising a pair substantially parallel base members connected by a pair substantially parallel intermediate members extending therebetween, has its base members formed of the same material as the machine bed wherein the material is a cast mineral material comprising a synthetic binder and mineral fillers. It is a particular feature that the base members of the frame member be cast with the machine bed as a unitary structure out of the cast mineral material.

9 Claims, 2 Drawing Sheets

FRAME MEMBER FOR SUPPORTING A WORKPIECE IN A MACHINE TOOL

BACKGROUND OF THE INVENTION

The present invention is drawn to a frame member for supporting a workpiece from a machine bed of a machine tool and, more particularly, a frame member for supporting a workpiece in a machine tool employing spark erosion.

There is an ever increasing need for very high precision machining processes due to the fine tolerance ranges required in many machining applications. A known high precision machining process uses spark erosion. Conventional mounting frames, usually of welded construction, do not exhibit the necessary stability both in mechanical and thermal properties when used in spark erosion machine tools for very high precision machining processes.

It is the principle object of the present invention to provide a frame member for supporting a workpiece from a machine bed of a machine tool, particularly a spark erosion machine tool, which exhibits thermal and mechanical stability over workpiece frame member supports heretofore known.

SUMMARY OF THE INVENTION

The foregoing object is achieved by way of the present invention wherein the frame member, comprising a pair of substantially parallel base members connected by a pair of substantially parallel intermediate members extending therebetween, has its base members formed of the same material as the machine bed wherein the material is a cast mineral material comprising a synthetic binder and mineral fillers. It is a particular feature of the present invention that the base members of the frame member be cast with the machine bed as a unitary structure out of the cast mineral material.

DETAILED DESCRIPTION

The present invention is drawn to a frame member for supporting a workpiece from a machine bed of a machine tool, particularly, a spark erosion machine tool.

In accordance with the present invention the frame member comprises a pair of substantially parallel base members connected by a pair of substantially parallel intermediate members extending between the base members so as to form a substantially rectangular frame defining an opening therewithin. In accordance with the present invention, the improvement over prior art frame members is forming the parallel base members out of the same material from which the machine bed is formed wherein the material is a cast mineral material comprising a synthetic binder and mineral fillers.

In accordance with the present invention, the mineral fillers are selected from the group consisting of rock, glass, metals and mixtures thereof. Crushed silicon limestone is a particularly suitable mineral filler. It is preferred that the particle size of the mineral filler not exceed 20 millimeters. In addition, the mineral filler should be compatible with and wettable with the binder material. A suitable binder is an epoxy resin material. A particularly suitable material from which the machine bed and base members may be cast is sold under the trademark RHENOCAST ® sold by Rhenocast AG of Schaffhausen, Switzerland.

In accordance with the preferred embodiment the base member and machine bed are cast as a unitary structure from the cast mineral material. By casting the base members in the machine bed as a unitary structure, thermal and mechanical stability are insured.

The present invention will be described in more detail with regard to the figures.

Figure 1:
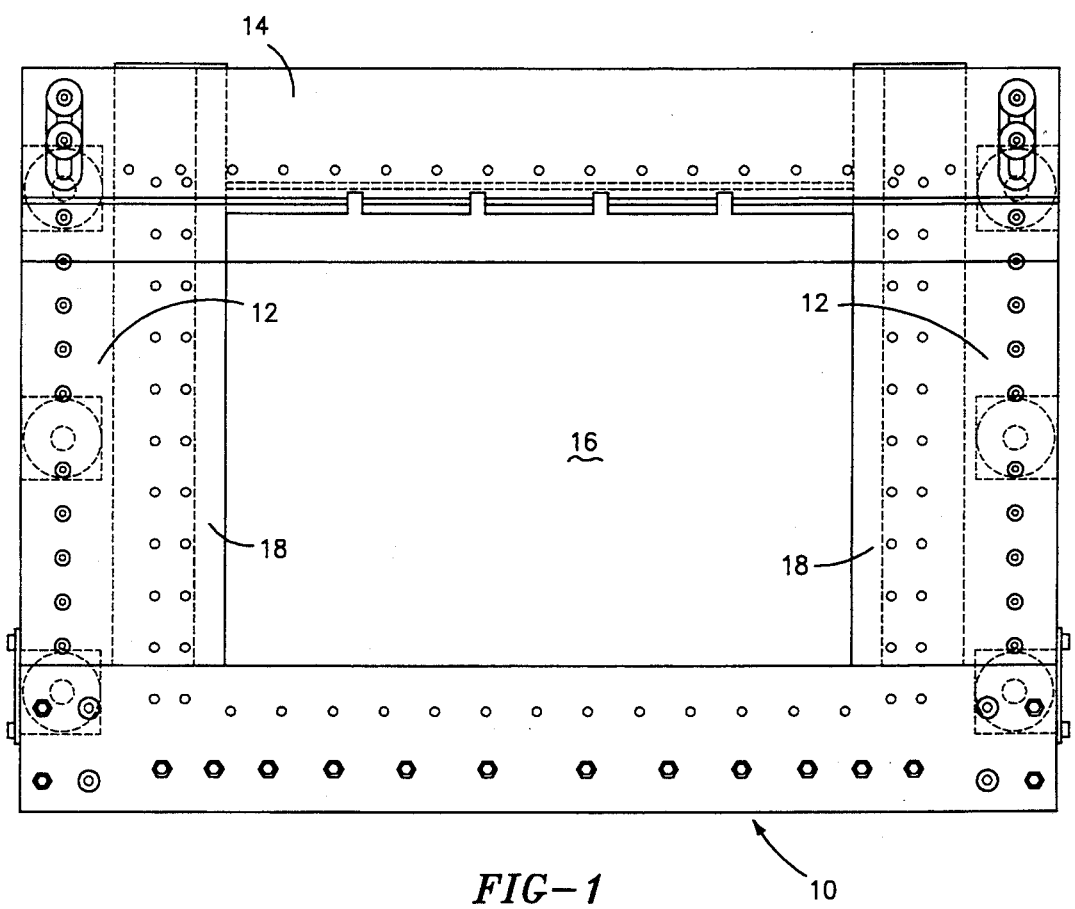
FIG. 1 is a top view of one embodiment of a frame member in accordance with the present invention.

FIG. 1 is a top view of a frame member in accordance with the present invention. The frame member 10 comprises a pair of base members 12 interconnected by a pair of intermediate members 14. The base members 12 are substantially parallel as are the intermediate members 14 which extend between the base members 12 and are substantially perpendicular therewith. The base members 12 and intermediate members 14 define an opening 16 in the frame. A plate 18 is connected to the base member 12. The workpiece (not shown) may be supported from the plate member 18.

Figure 2:
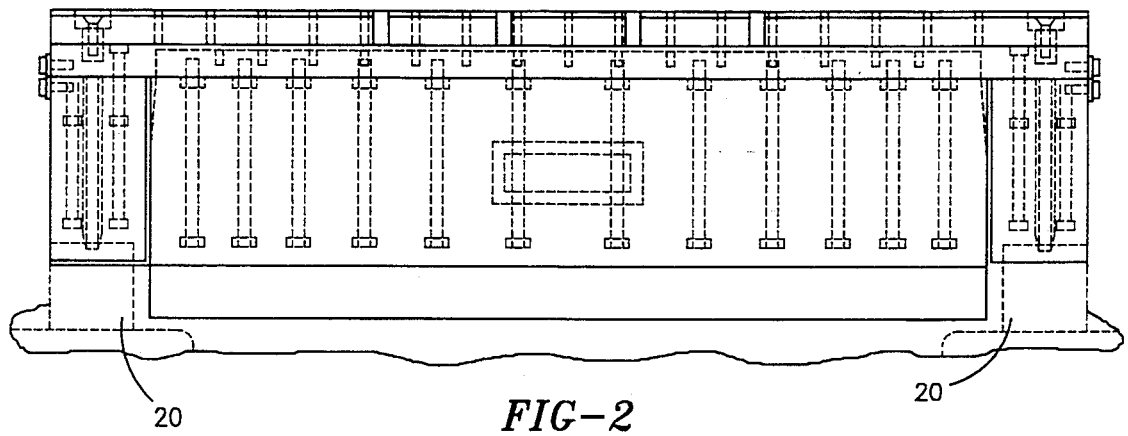
FIG. 2 is a side view of the frame member of FIG. 1.

FIG. 2 is a side view of the frame of FIG. 1 wherein the base members 12 are mounted on a machine bed 20 shown in phantom lines. In accordance with the present invention, the base members 12 and the machine bed 20 are formed of the same cast mineral material described above.

Figure 3:
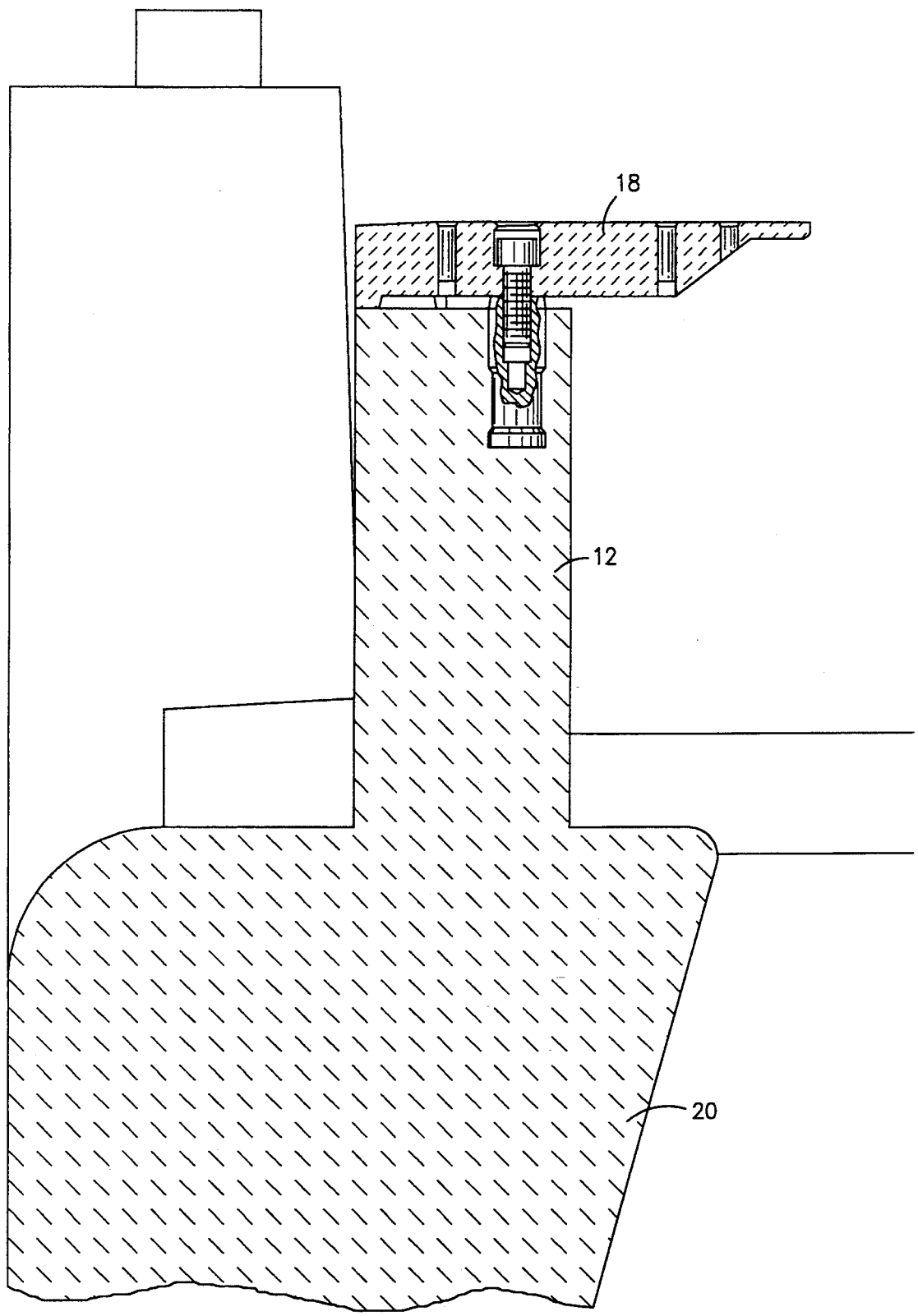
FIG. 3 is a partial sectional view of a second embodiment of a frame member in accordance with the present invention.

FIG. 3 shows a preferred embodiment of the present invention. FIG. 3 is a partial sectional view of the frame member of the present invention wherein the machine bed 20 and base member 12 are cast together as a unitary structure out of the cast mineral material. The plate 18 is secured to the base member 12 by screws for supporting the workpiece.

The intermediate members 14 may be made of the same cast mineral material either integral with or separate from the base members 12.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A frame member for supporting a workpiece from a machine bed of a machine tool, said frame member comprising a pair of substantially parallel base members connected by a pair of substantially parallel intermediate members extending between the base members so as to form a substantially rectangular frame defining an opening therewithin, the improvement comprising said machine bed and said parallel base members being formed of the same material wherein said material is a cast mineral material comprising a synthetic binder and mineral fillers wherein the base members and the machine bed are cast as a unitary structure so as to substantially eliminate vibrations from the machine on the workpiece.

2. A frame member according to claim 1 wherein said mineral fillers are selected from the group consisting of rock, glass, metals and mixtures thereof.

3. A frame member according to claim 2 wherein the mineral fillers are wettable with the binder.

4. A frame member according to claim 3 wherein the binder is an epoxy resin.

5. A frame member according to claim 1 wherein the binder is an epoxy resin.

6. A frame member according to claim 1 wherein the mineral fillers are wettable with the binder.

7. A frame member according to claim 6 wherein the binder is an epoxy resin.

8. A frame member according to claim 2 wherein said mineral filler is a crushed silicon limestone.

9. A frame member according to claim 2 wherein the mineral fillers have a particle size of 20 mm.

* * * * *